Patented Aug. 22, 1950

2,519,465

UNITED STATES PATENT OFFICE 2,519,465

FRESHENING AND BLEACHING PROCESS FOR FRUITS AND VEGETABLES

Hazara S. Hateshi, Los Angeles, Calif., assignor, by mesne assignments, to Zenith Processing Corporation, Los Angeles, Calif., a corporation of California No Drawing. Application May 2, 1947, Serial No. 745,641

5 Claims. (Cl. 99—156)

1

This invention relates to methods of freshening and bleaching fresh fruits and vegetables and to materials for use in such process. The subject matter of this invention is related to the subject matter of Patents Nos. 1,447,615, 1,828,179, 1,911,361, 2,124,412, 2,215,446 and 2,413,129

During shipment many fruits and vegetables deteriorate, change color, and become weakened so that upon reaching their destination and fruits and vegetables do not have a fresh appearance but instead are often discolored and upon exposure to atmospheric temperatures, degenerate rapidly. Lettuce, for example, not only develops a rusty brown or reddish coloration in the area of the butt and external ribs but soften, become slimy, and exhibit what is termed "plasmolysis."

The present invention is based upon the discovery that beta-hydroxybutyraldehyde has an extraordinary and highly desirable effect upon fresh fruits and vegetables in maintaining the initial or original fresh appearance, preventing discoloration and actually intensifying, in some instances, the natural green color of the leaves. In accordance with the present invention, therefore, this particular chemical (also known as 3-hydroxybutanal) may be used as a component of the ice with which the fruits and vegetables are refrigerated during shipment, may be absorbed upon the pads or separators in the crates in which the fruits or vegetables are packed, or may be brought into contact with the fruits or vegetables in the form of an aqueous solution in other manners.

It is an object of the present invention, therefore, to disclose and provide a method of maintaining the fresh appearance of fruits and vegetables during shipment by subjecting them to the action of an aqueous medium containing 3-hydroxybutanal.

A further object of the invention is to disclose and provide, as a composition or material for use in preserving the fresh appearance of fruits and vegetables during shipment, an aqueous medium (either liquid or solid) containing effective quantities of 3-hydroxybutanal.

The term "aqueous medium" as used hereafter shall be deemed to cover water in either liquid or frozen form. Although the method of the invention is particularly effective in the handling of lettuce, celery, endive, spinach, broccoli, carrots, etc., it also can be used to good advantage in the shipment of cantaloup, cucumbers, and many other fruits and vegetables.

2

In accordance with one method of carrying out the invention, 3-hydroxybutanal (also known as "aldol") may be added to ordinary water in quantities sufficient to impart a concentration of from about 0.01% to 0.05% by weight. 3-hydroxybutanal appears to have exceptional and distinctive properties for the purposes of this invention, not only in producing the desired results, but also in its freedom from deleterious effects. For example, its wetting characteristics, its freedom from alkaline reaction and resulting puckering of vegetable growths, buds, etc., its non-toxic characteristics, its high solubility, its intensification of chlorophyl-bearing leaves and other properties may be given as examples. Since aldol is non-toxic, non-poisonous and extremely soluble in water, the aqueous solution may be frozen and the ice thus formed is then crushed and is used in packing the individual crates or in refrigerating the cars in which the fruits or vegetables are being shipped. The crushed ice (often termed "snow" in the trade) may be blown into the box-car so as to cover the fruit piled therein or the crates of vegetables arranged in such car. During shipment some melting takes place and the aqueous medium or solution containing the freshening agent contacts the fruits and vegetables and maintains their fresh appearance. Upon reaching their destination, it will be observed that the reddening, discoloration or deterioration normally found has not occurred. Moreover, the fruits and vegetables so shipped will have longer lasting qualities in the individual markets in which they are sold at their destination.

In the packing of certain vegetables, particularly lettuce, it is customary to arrange the lettuce in layers in a crate, separating each layer from the adjacent layers by means of sheets of material. These materials may vary in absorbency and may include raw pulp sheets, cellulosic sheets of high absorbency, chipboard, various grades of papers, or even parchment or parchmentized paper. These separators or sheets may be wetted with an aqueous medium containing from approximately 0.05% to 0.5% of 3-hydroxybutanal. The so moistened sheets are then placed in contact with the vegetables and in the case of lettuce, in contact with the butt. Normal water-ice may be used both within and on the exterior of the crates.

The freshening agent, aldol, may also be sprayed either directly upon parchment or other material being used in the wrapping or packing of the vegetables, or in the form of a solution directly upon the vegetables. In the latter case, the solutions may contain from 0.01% to approximately 0.05% of aldol.

It also may be noted that in most instances best results are obtained by the conjoint use of the 3-hydroxybutanal and refrigeration, although improved results are obtained in the so-called dry pack where the fruits or vegetables are simply sprayed with an aqueous medium containing the freshening agent.

Those skilled in the art will readily appreciate various changes and modifications which may be made and the adaptations of the teachings of this invention to the general processes of the prior art mentioned hereinbefore.

I claim:

1. In a method of maintaining the fresh appearance of fruits and vegetables during shipment, the step of subjecting fresh fruits and vegetables to the action of an aqueous medium containing 3-hydroxybutanal.

2. In a method of maintaining the fresh appearance of fruits and vegetables during shipment, the step of subjecting fresh fruits and vegetables to the action of an aqueous medium containing from about 0.01% to 0.5% by weight of 3-hydroxybutanal.

3. In a method of maintaining the fresh appearance of fruits and vegetables during shipment, the steps of: subjecting fresh fruits and vegetables to the action of an aqueous medium containing 3-hydroxybutanal, and refrigeration.

4. In a method of maintaining the fresh appearance of fruits and vegetables during shipment, the step of contacting the butts and ribs of leafy vegetables with an aqueous medium containing 3-hydroxybutanal.

5. In a method of maintaining the fresh appearance of lettuce during shipment, the step of: supplying an aqueous medium containing 3-hydroxybutanal to the butts and ribs while simultaneously maintaining the lettuce at temperatures below 42° F.

HAZARA S. HATESHI.

REFERENCES CITED

The following references are of record in the file of this patent:

UNITED STATES PATENTS

| Number | Name | Date |
|---|---|---|
| 2,011,465 | Balls et al. | Aug. 13, 1935 |
| 2,181,765 | Musher | Nov. 28, 1939 |
| 2,215,446 | Wilson | Sept. 17, 1940 |
| 2,398,781 | Frandsen | Apr. 23, 1946 |

OTHER REFERENCES

Hackh's Chem. Dic., 2nd edition, Blakiston's Son & Co., 1937, Philadelphia; page 32.

Smith et al.: "Industrial and Engineering Chem.," July 1926, pages 691–693.

Condensed Chem. Dict., 3rd edition, Reinhold Publishing Corp., N. Y., 1942; pages 55 and 56.

"Food Manufacture," Dec. 1, 1939, pages 376 and 377.